(12) United States Patent
Tang

(10) Patent No.: US 8,490,088 B2
(45) Date of Patent: Jul. 16, 2013

(54) ON DEMAND VIRTUAL MACHINE IMAGE STREAMING

(75) Inventor: Chunqiang Tang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 12/879,594

(22) Filed: Sep. 10, 2010

(65) Prior Publication Data
US 2012/0066677 A1 Mar. 15, 2012

(51) Int. Cl.
*G06F 9/455* (2006.01)
(52) U.S. Cl.
USPC .................................................. 718/1
(58) Field of Classification Search
USPC .................................................. 718/1
See application file for complete search history.

(56) References Cited

U.S. PATENT DOCUMENTS

| | | | |
|---|---|---|---|
| 2006/0155735 A1 | 7/2006 | Traut et al. | |
| 2008/0178244 A1 | 7/2008 | Ayres et al. | |
| 2009/0006534 A1 | 1/2009 | Fries et al. | |
| 2009/0328030 A1 | 12/2009 | Fries et al. | |
| 2010/0042993 A1 | 2/2010 | Vasilevsky et al. | |
| 2010/0107163 A1 | 4/2010 | Lee | |
| 2010/0333085 A1 | 12/2010 | Criddle et al. | |
| 2011/0107044 A1* | 5/2011 | Young et al. | 711/162 |
| 2011/0246985 A1* | 10/2011 | Zhou et al. | 718/1 |

OTHER PUBLICATIONS

International Search Report mailed Sep. 27, 2011 in corresponding International Application No. PCT/US11/39209.

* cited by examiner

*Primary Examiner* — Mengyao Zhe
(74) *Attorney, Agent, or Firm* — Scully, Scott, Murphy & Presser, P.C.; Louis J. Percello, Esq.

(57) ABSTRACT

On demand image streaming (ODS), in one aspect, may perform both copy-on-write and copy-on-read to gradually bring data on remote storage server to a host's local disk. Prefetching may be performed during the time the resources are otherwise idle to bring in data from the remote storage server to the host's local disk. A new image format and the corresponding block device driver for a hypervisor or the like may be also provided. ODS' image format may include a header and a bitmap that indicates whether the data sectors are on local disk or remote storage server, and an image content, for instance, stored in raw format.

25 Claims, 8 Drawing Sheets

Without ODS
*(delay before VM is ready)*

With ODS
*(quick VM startup)*

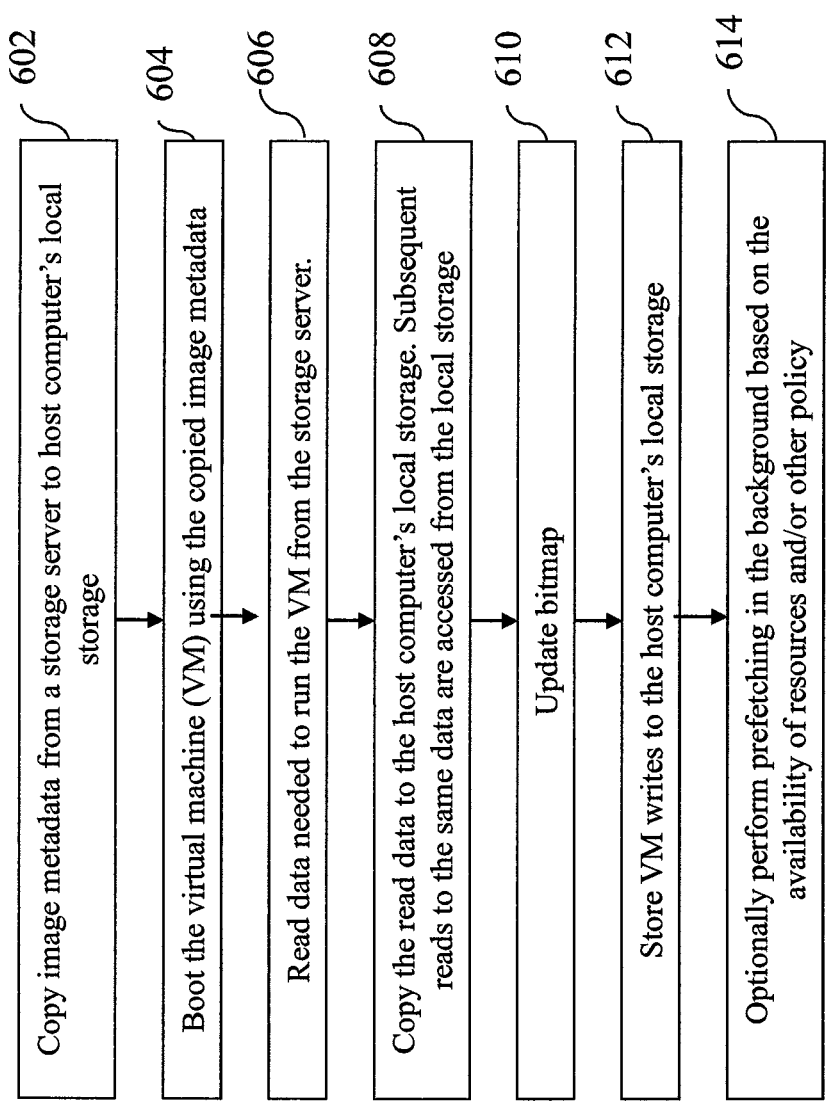

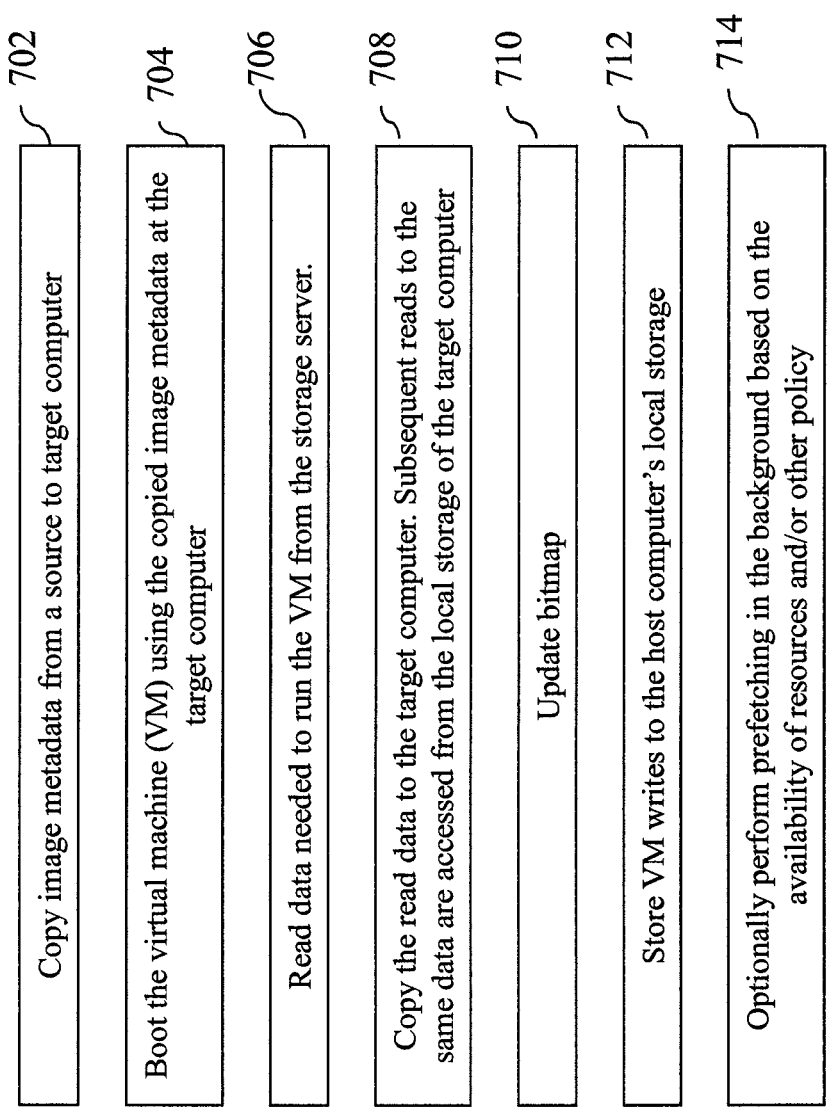

ON DEMAND VIRTUAL MACHINE IMAGE STREAMING

FIELD

The present application generally relates to computer systems and more particularly to an on demand virtual machine image streaming, for example, for cloud environment or others.

BACKGROUND

In Cloud computing environment, the block device storage needed by a virtual machines (VM) can be allocated from multiple sources: the host's direct-attached storage (DAS, i.e., local disk), network-attached storage (NAS, e.g., NFS), or storage area network (SAN). These options offer different performance, reliability, and availability at different costs.

One currently known VM creation method copies over the entire VM file in raw format (a byte-by-byte copy of physical block device's content) from a read-only image template stored at an NAS to a DAS local to a host. Only then, could the host's VM be booted up and executed. Such methodology incurs a long delay due to the time it takes to copy the entire image template to the DAS until the new VM can be started and used.

Another known method only performs copy-on-write to the host's DAS, i.e., only store modified data on DAS while unmodified data are always read from the backing image. Using an image template stored on NAS as the backing image may support a faster VM creation because it need not copy the image template from NAS to DAS when creating a new VM. However, repeatedly reading unmodified data from NAS may generate excessive network traffic and I/O load on the share NAS server. This is the case especially in Cloud environment where many VMs are involved. Such a method may require that the Cloud environment provide the network and the NAS server that have sufficient capacity for handling such traffic and I/O load.

As another consideration, the existing hypervisors can migrate a VM only if its image file is stored on NAS. Perhaps due to the inability of migrating a VM running on DAS, a Cloud provider may simply notify the user of an upcoming maintenance operation on a host and asks the user to handle the consequences of losing the VM. This may be simple for the Cloud service provider but may not be desirable for Cloud users.

BRIEF SUMMARY

A method and system for on demand virtual machine image streaming are provided. The method, in one aspect, may include copying, from a storage server storing one or more image templates (also referred to as backing images) corresponding respectively to one or more virtual machines, an image metadata associated with a selected virtual machine to a host computer's local storage, wherein the host computer's local storage initially does not include an image of the selected virtual machine. The method may also include booting the selected virtual machine at the host computer using the copied image metadata, allowing the selected virtual machine to read data from the image template on the storage server needed to continue executing the selected virtual machine at the host computer, if the needed data are not stored on the host computer's local storage. The method may further include copying the read data of the image template to the host computer's local storage from the storage server, if the read data of the image template are not stored on the host computer's local storage. Subsequent reads to the same data are done from the host computer's local storage. The method may also include setting a bit in a bitmap to indicate that the read data are stored on the host computer's local storage. The method may yet further include utilizing resource idle time to prefetch data of the image template (backing image) associated with the selected virtual machine from the storage server to the host computer's local storage.

A method for on demand virtual machine image streaming, in another aspect, may include copying an image metadata associated with a virtual machine, from a source computer storing an image corresponding to the virtual machine to a target computer, wherein the target computer initially does not include the image of the virtual machine. The method may also include booting the virtual machine at the target computer using the copied image metadata, and allowing the virtual machine at the target computer to read data of the image on the source computer needed to continue executing the virtual machine at the target computer, if the needed data of the image are not stored on the target computer. The method may also include copying the read data of the image from the source computer to the target computer, if the read data of the image are not stored on the target computer wherein subsequent reads of the same data read the copied data at the target computer. The method may further include setting a bit in a bit map to indicate that the read data are stored on the target computer.

A system for on demand virtual machine image streaming, in one aspect, may include a target computer operable to copy an image metadata associated with a virtual machine, from a source computer storing an image template corresponding to the virtual machine, wherein the target computer initially does not include the image template of the virtual machine, and a storage device locally attached to the target computer. The target computer may be further operable to boot the virtual machine at the target computer using the copied image metadata and allow the virtual machine at the target computer to read data of the image template on the source computer needed to continue executing the virtual machine at the target computer, if the needed data of the image template are not stored on the target computer. The target computer may be further operable to copy the read data of the image template from the source computer to the storage device locally attached to the target computer, if the read data of the image template are not stored on the target computer, wherein subsequent reads of the same data are done from the storage device locally attached to the target computer. The target computer may be yet further operable to set a bit in a bit map to indicate that the read data are stored on the target computer.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 6 is a flow diagram illustrating a method in one embodiment for creating a new VM.

FIG. 7 is a flow diagram illustrating a method in one embodiment for live migration of VM.

DETAILED DESCRIPTION

An on-demand image streaming (ODS) of virtual machine images in one embodiment of the present disclosure may perform copy-on-write (CoW), copy-on-read (CoR), and prefetching. Copy-on-read avoids repeatedly reading a data sector from a remote storage server (e.g., network-attached storage (NAS)), by saving a copy of the returned sector on computer host machine's local disk (e.g., direct-attached storage (DAS)) for use. Prefetching uses idle time to copy from a remote storage server (e.g., NAS) to the local disk (e.g., DAS) the rest of the image that has not been accessed by the virtual machine. During copy-on-write and copy-on-read, the present disclosure in one embodiment provides for updating both data and metadata on disk, where the metadata indicate that now the data are stored in the local disk (e.g., DAS) instead of the remote storage server (e.g., NAS).

The ODS of the present disclosure in one embodiment may include a new image format and the corresponding block device driver for QEMU. The ODS of the present disclosure in one embodiment may be designed for virtual machines whose images are stored on host computer's direct-attached storage. The main use cases of the ODS may include (1) instant creation of a virtual machine (VM) on direct-attached storage (e.g., DAS, i.e., local disk to host) without waiting for the completion of copying the VM's image template from remote storage server to DAS, and (2) live VM migration between machines that use DAS to host VMs.

The ODS of the present disclosure in one embodiment may perform both copy-on-write and copy-on-read to gradually bring data on remote storage server to a host's local disk. For a Cloud environment with a large number of VMs, copy-on-read avoids repeatedly reading the same data sector from remote storage server, which may generate excessive network traffic or input/output (I/O) load on storage server. The ODS of the present disclosure in one embodiment may also perform prefetching. It finds idle time to copy not-yet-touched image data from remote storage server to the host's local disk. ODS' image format in one embodiment may include (1) a header, (2) a bitmap that indicates whether the data sectors are on local disk or remote storage server, and (3) the image content stored in raw format.

Figure 1:
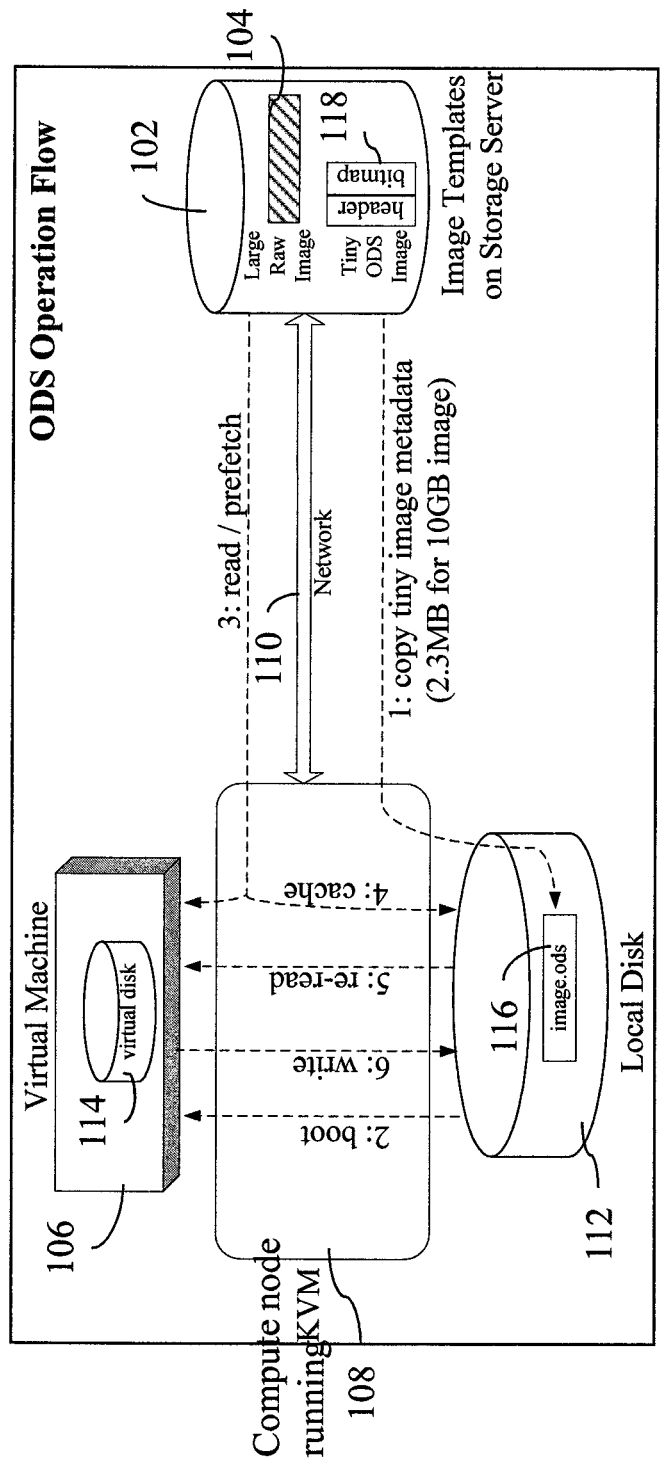
FIG. 1 is a diagram showing system components and operation flow performed by the on demand virtual machine (VM) streaming of the present disclosure in one embodiment.

FIG. 1 is a diagram showing system components and operation flow performed by the on demand virtual machine (VM) streaming of the present disclosure in one embodiment. A storage server 102 stores one or more image templates 104 of corresponding one or more virtual machines. The storage server 102 is usually located remotely from a host computer 108 hosting a virtual machine 106 and connected via a network I/O. An example of the storage server 102 may be an NAS server. The storage server 102 may be shared (e.g., shared storage server (SONAS) and may hold image templates exported through a network file system (NFS). An example of a local disk 112 may be DAS. DAS may be considered as ephemeral storage while NAS may be considered as ephemeral storage. Ephemeral storage can be used to store a VM's disk image that contains the root file system. When the VM terminates, data on ephemeral storage are lost. Optionally, a user can attach persistent storage to a VM. Persistent storage exists beyond the lifetime of a VM and, for example, can be used to store a relational database's persistent data. In a Cloud environment, ephemeral storage is provided by host's local disks, possibly without hardware RAID.

VMs may be created based on read-only image templates 104, which are stored on a storage server 102 and accessible to all hosts (e.g., computer or machine that hosts or runs VMs). A VM's virtual disk 114 may be stored as a regular file 116 in the host's file system. A host computer (a compute node) 108 may include a hypervisor such as KVM. A hypervisor (or a virtual machine monitor) is a software component that allows multiple operating systems to run concurrently on a given machine (hardware or processor). Depending on the hypervisor, multiple formats for virtual disks 114 may be supported. For instance, KVM/QEMU supports multiple formats for virtual disks. KVM is a Linux kernel virtualization infrastructure. It uses QEMU for I/O emulation. RAW format is a byte-by-byte copy of a physical block device's content stored in a regular file. QCOW2 is another image format supported by QEMU. The QCOW2 image only stores modified data, while unmodified data are always read from the backing image (i.e., storage server, e.g., NAS).

Initially, the local disk 112 of the host computer 108 does not contain an image template for running a selected virtual machine 106. In response to receiving an instruction to start up or boot a VM 106, the ODS of the present disclosure in one embodiment copies from the storage server 104, a small image metadata 118 to the local disk 112 as shown at 116. The image metadata includes a header and a bitmap. The header identifies the image template and the bitmap is used for identifying which portions (e.g., sectors) of the image template are stored locally. In its initial state, the bitmap in one embodiment identifies the image template's sectors that are entirely filled with zeros. At runtime, there is no need to copy these zero-filled sectors from the storage server 104 to the local disk 112. The ODS of the present disclosure in another embodiment may omit the step of copying from the storage server 104, a small image metadata 118 to the local disk 112 as shown at 116. In this case, the metadata is created from scratch on the local disk 112, with all bits in the bitmap set to indicate that all data sectors are not stored locally. The formal embodiment has the advantage of not copying zero-filled sectors in the image template. The VM 106 is booted using the image metadata 118 and as the VM 106 accesses and reads additional data 104 from the storage server 102 to use for its booting and execution, that data is also copied or saved to the local disk 112 as local image 116. The bit or bits in the bitmap are also updated to indicate that the corresponding data portions or sectors of the image template 104 have been stored locally. The next time the VM 106 needs to access the same data, the locally stored version is used rather than going through a network to access the image template 104 on the storage server 102.

The run time operation of the ODS of the present disclosure may include an asynchronous copy-on-read, copy-on-write, and prefetching image data across the network in the background. For asynchronous copy-on-read, when the VM 106 reads a sector for the first time, a hypervisor enhanced with the ODS of the present disclosure on the host machine 108 fetches the sector from the remote storage server 102 across the network I/O. In the background, the hypervisor on the host computer 108 enhanced with the ODS of the present disclosure in one embodiment stores the sector in its local ODS file 116 and sets the bitmap accordingly. The bitmap is part of the ODS image and is stored on the local disk. Subsequent reads of the sector always get data directly from the local ODS file 116 in one embodiment of the present disclosure. For a direct write (copy-on-write) to the local disk, when the VM writes a sector, the hypervisor on the host computer 108 enhanced with the ODS of the present disclosure in one embodiment writes to the local ODS file 116 directly without the need of fetching 4 KB data from the storage server 102. The ODS of the present disclosure in one embodiment may also perform prefetching of image data across the network in the background. Guided by a configurable policy, as a background operation, the hypervisor on the host computer 108 enhanced with the ODS of the present disclosure in one embodiment may prefetch the entire raw image data 104 across the network I/O in a streaming fashion and store the data in the local ODS file 116. For example, a prefetching policy may dictate that the prefetching may start after the VM 106 runs for 12 hours and at midnight when the workload on the network I/O and the storage server 102 is light. As a result, no data is prefetched for a VM whose lifetime is shorter than 12 hours according to this example policy. A system administrator or other users may set the policy in one embodiment.

Figure 2:
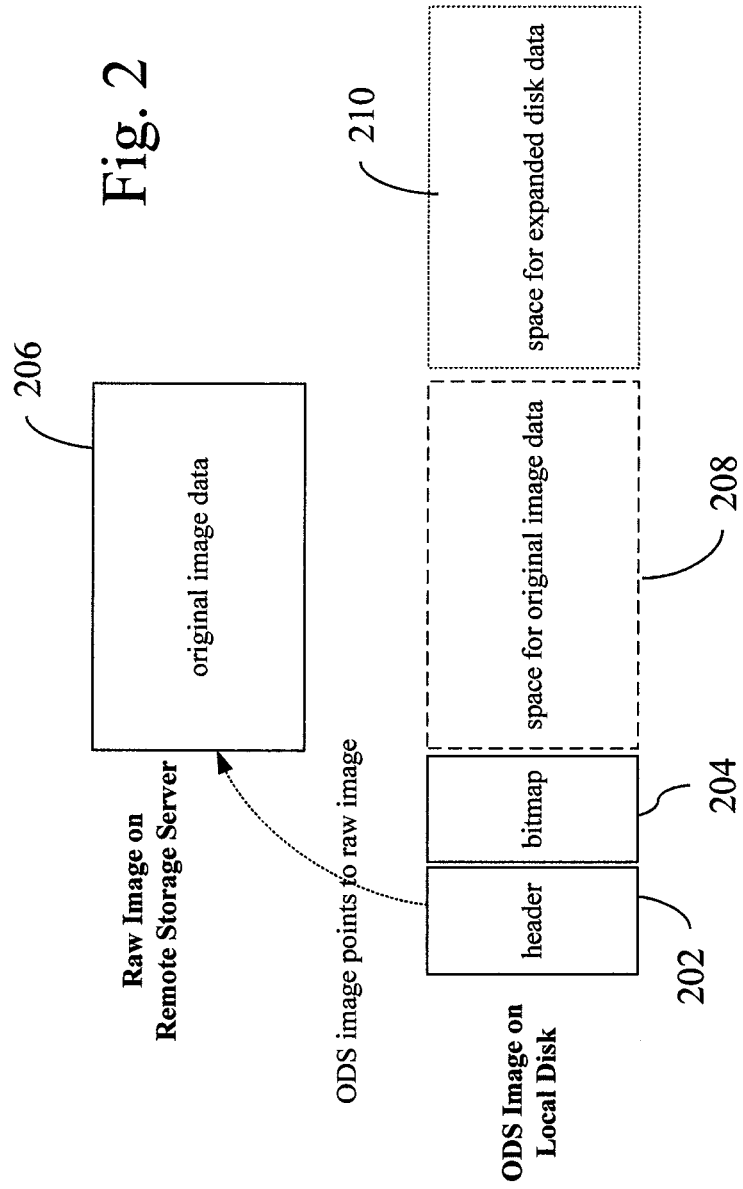
FIG. 2 shows a simplified view of an ODS image format in one embodiment of the present disclosure.

FIG. 2 shows a simplified view of an ODS image format in one embodiment of the present disclosure. A virtual disk in the ODS format shown in FIG. 2 may be allocated for each VM running on a host machine or computer. In one aspect, an ODS image is based on a read-only backing image. The ODS header 202 stores a reference to the backing image 206 for identifying the virtual machine image template. A backing image refers to a virtual machine's image template stored in persistent storage. The reference may be the filename of the virtual machine image template, e.g., a string that stores the name of the raw image on which the ODS image is based. Other references may be used to identify the virtual machine image template. The ODS image format also include a bitmap 204, for instance, with one bit for each data sector in the virtual disk image. The bit indicates whether the current content of the corresponding sector is stored in the ODS image or in the backing image. For example, a bit is set to 1 if its corresponding sector has already been copied from the raw image into the ODS image, or if the sector has already been written by the VM locally. The size of the bitmap is proportional to the size of the image template in one embodiment of the present disclosure. An ODS block device driver is implemented, for example, in QEMU, which understands the ODS format and handles disk input/output (I/O) requests issued by the VM. The space for image data 208 may be initially empty; there is no data initially and no space need be reserved initially. The size of the space for image data 208 may become the same as the template image from which the image data is copied.

The ODS image format may also include a space for expanded disk data 210. A space for expanded disk data 210 can be of arbitrary size and the size can be changed at any time in order to support resizing of the image. There is no corresponding data in a template image for this space 210. Further, no bitmap is needed that corresponds to the data in this space 210. Thus, the size of the bitmap does not depend on the size of the space for expanded disk data 210; ODS image resizing due to the space for expanded disk data 210 does not affect the bitmap. It is a constant time operation to resize an ODS image to add "space for expanded disk data", regardless of the size of the "expanded disk data". It only needs to change a "disk_size" field in the "header" of an ODS image. The data in this space 210 may be used only locally. The space for expanded disk data is optional.

To start a new VM, the host creates an ODS image on its local disk (e.g., DAS), whose reference to a backing image points to the image template 206 stored in a storage server (e.g., NAS). For example, an ODS image that includes only the header and the bitmap may be copied to the local disk (e.g., DAS). The VM may be then booted instantly without copying any image data (template image) from the storage server (e.g., NAS) to the local disk (e.g., DAS), i.e., the ODS image's "space for disk data" section 208 initially is empty. As an example, for a 10 gigabyte (GB) original raw image, the bitmap may be only 2.5 megabytes (MB). Only the 2.5 MB bitmap plus the small header fields need be copied across the network when creating and booting up a new VM. When handling a disk write request from the VM, QEMU's ODS driver may store the data in the ODS image 208 and update the bitmap 204 accordingly. This behavior is referred to as "copy-on-write".

When handling a disk read request from the VM, the ODS driver checks the bitmap 204 to determine if the requested data are in the ODS image. IF so, the data are read from the ODS image and returned to the VM. If not, the data are read from the backing image 206 and returned to the VM. While the VM continues to process the returned data, in the background, a copy of the returned data is saved in the ODS image 208 and the bitmap 204 is updated accordingly so that future read requests for the same data will get them from the ODS image on the local disk (e.g., DAS) rather than from the backing image 208 on the storage server (e.g., NAS). This behavior is referred to as "copy-on-read". With this copy-on-read behavior, a data sector may be read from the storage server (e.g., NAS) at most once, which helps avoid generating excessive network traffic and I/O load on the storage server (e.g., NAS).

Copy-on-read gradually migrates the content of the backing image 206 from the storage server (e.g., NAS) to the host computer's local disk (e.g., DAS). ODS's prefetching mechanism may further leverages idle resources to accelerate data migration. Table 1 shows an example of the detailed layout of an ODS image on disk in one embodiment of the present disclosure.

TABLE 1

| Struct OdsImage Layout { | |
|---|---|
| uint32_t | magic; |
| uint32_t | version; |
| uint64_t | ods_header_size; |
| int64_t | disk_data_size; |
| char | backing_image[1024] |
| int64_t | effective_backing_image_size; |
| uint32_t | all_data_in_ods_image; |
| uint32_t | bitmap_unit; |
| uint32_t | page_size; |
| ... /* some other fields skipped */ | |
| char | separate_disk_data_file[1024] |
| uint8_t | padding_to_page_boundary_1[..]; |
| uint8_t | bitmap [...]; |
| uint8_t | padding_to_page_boundary_2[..]; |
| uint8_t | disk_data[...]; |
| } | |

The disk_data section may store disk content in the raw format. The content of the sector with Logical Block Address LBA=n may be stored at disk_data[n*512], where 512 is the sector size.

Figure 3:
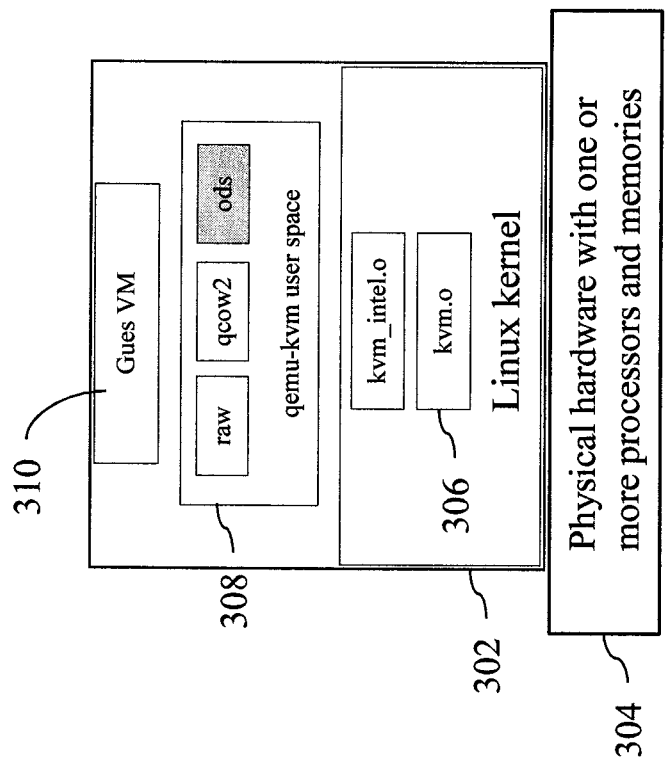
FIG. 3 an ODS driver in KVM/QEMU stack in one embodiment of the present disclosure.

FIG. 3 an ODS driver in KVM/QEMU stack (an example hypervisor) in one embodiment of the present disclosure. An operating system kernel 302 such as a Linux kernel may execute on a hardware processor 304. The operating system kernel 302 may run a plurality of hypervisor programs, e.g., KVM, a different vendor version of KVM, etc. Another example of a hypervisor is Xen. A hypervisor program 306 (e.g., KVM) allows a virtual machine 310 to run on the hardware processor 304. Furthermore, a hypervisor program 306 may support multiple virtual image formats 308, e.g., raw, qcow2 and the ODS of the present disclosure. At startup of a virtual machine 310, the virtual machine tries to read the first sector (e.g., 512 kilobytes (KB)) on the corresponding virtual disk (the image formats 308 on a local disk). A hypervisor program that is extended to function with the ODS of the present disclosure detects that the ODS image is not present in the virtual disk (local disk) yet, and starts (executes) the ODS methodology of the present disclosure. The ODS of the present disclosure streams over the needed data as described herein, booting up the VM almost instantaneously in one embodiment. For implementation, hypervisor user space program (e.g., qemu-kvm user space program) may be changed to add ods.c and ods.h, without modifying other code. Particularly, no changes to the kernel of the computer node (e.g., Linux) need be made.

Figure 4A:
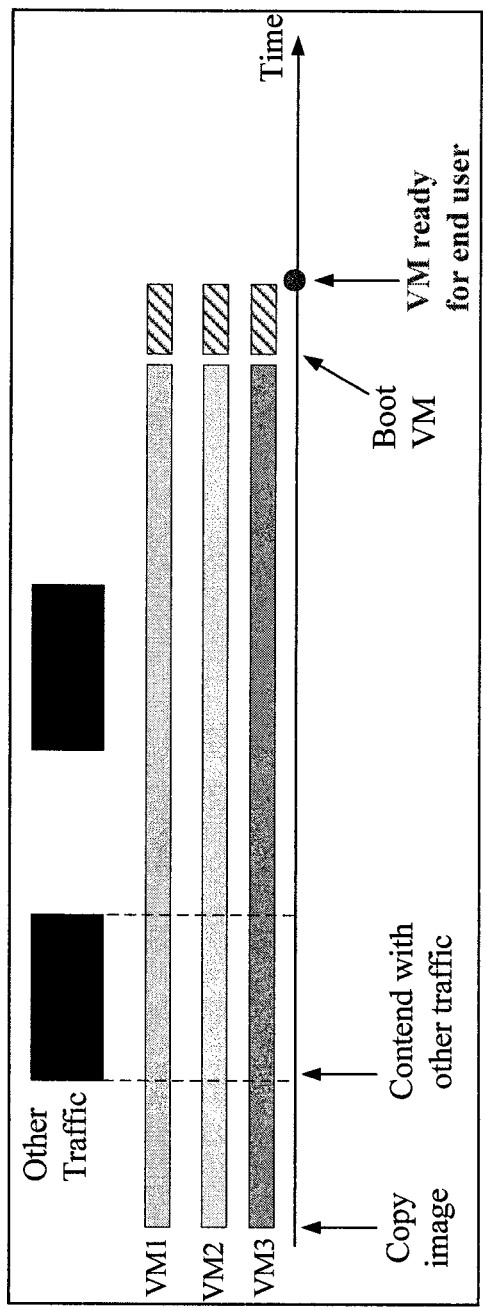
FIG. 4A and FIG. 4B show comparison of VM creation using RAW image and ODS image in one embodiment of the present disclosure.
Figure 4B:
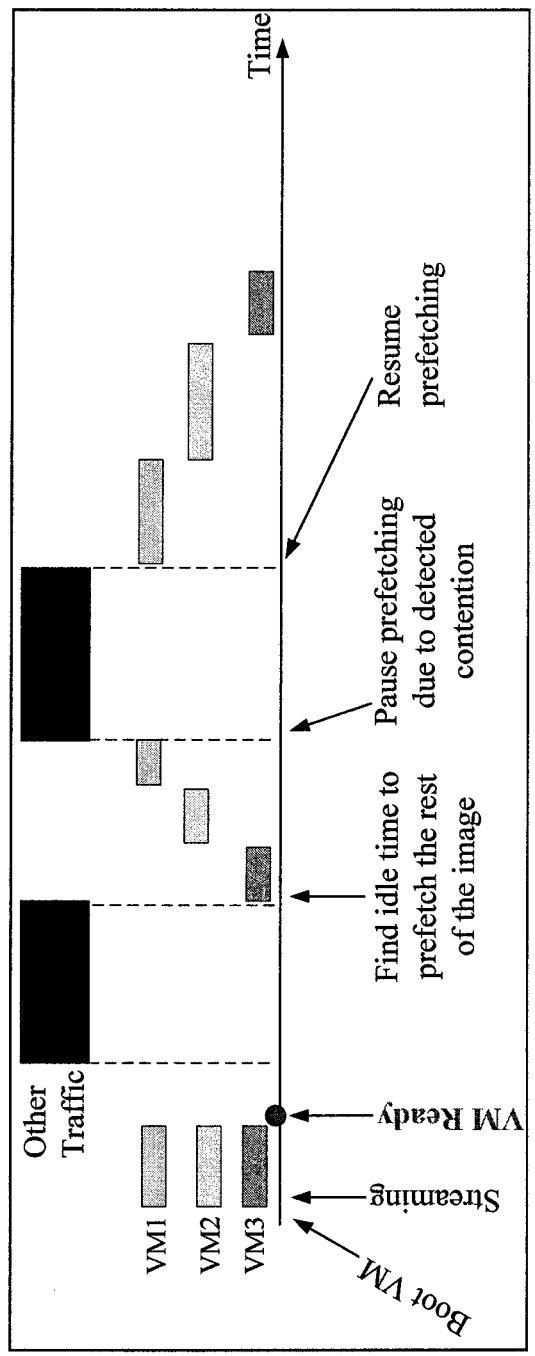

FIG. 4A and FIG. 4B show comparison of VM creation using RAW image and ODS image. The example shown creates three VMs concurrently. As shown in FIG. 4A, the VM creation process using the RAW image format needs to wait until an entire image template is copied from the storage server (e.g., NAS) to the local disk (e.g., DAS), and only then the VM is booted. This is the case even if much of the copied image data is not needed during the VM booting process and may even never be accessed throughout the VM's lifetime. ODS creation process of the present disclosure in one embodiment is shown in FIG. 4B. ODS boots the VM instantly without any image data on the local disk (e.g., DAS), and copies data from the storage server (e.g., NAS) to the host's local disk (e.g., DAS) on demand as they are accessed by the VM. In addition, ODS' prefetching mechanism finds resource idle time to copy from the storage server (e.g., NAS) to the local disk (e.g., DAS) the rest of the image or portions of the image that has not been accessed by the VM. Prefetching may be conservative in that if ODS detects contention on any resources (e.g., the storage server, the local disk, or the network), ODS may pause prefetching temporarily and resume prefetching later when congestion disappears or mitigates. In another embodiment, once image templates are copied to the local disk in their entirety by the prefetching operation, the present disclosure may also cache popular image templates on a host's local disk (e.g., DAS) so that the cached image templates can be used to create new VMs instantly, i.e., skipping the image copy step upon a cache hit.

The ODS of the present disclosure in one embodiment uses copy-on-read to bring data sectors from the storage server (e.g., NAS) to a local storage (e.g., DAS) on demand as the data are needed. Optionally, prefetching may be enabled in the ODS to use unused idle resources to copy not-yet-touched data sectors from the storage server (e.g., FIG. 1 at 102) to the local storage (e.g., FIG. 1 at 112). The ODS of the present disclosure in one embodiment may perform a whole-image prefetching. In whole-image prefetching, the ODS of the present disclosure in one embodiment uses idle resources to sequentially copy the entire image, for instance, from the first data sector to the last data sector, from the storage server (e.g., NAS) to a local storage (e.g., DAS). Optionally, in locality-based prefetching, one embodiment may prefetch not-yet-accessed data sectors that are closely related to those already accessed data sectors, instead of doing a sequential whole-image prefetching, Optionally, in profile-based prefetching, one embodiment may prefetch not-yet-accessed data sectors according to an image template profile that is constructed offline. The profile may prioritize the prefetching order for data sectors based on their importance, or identify data sectors that are usually accessed together, i.e., forming a working set using the caching terminology. If a data sector state is already $S_{in\_ods}$, that data sector is skipped by the prefetching procedure. Once the prefetching is finished, it sets a flag, e.g., all_data_in_ods_image flag, in the ODS image (e.g., see Table 1). Then all read and write requests issued by the VM can operate on the ODS images disk_data section directly without checking or updating the bitmap, because it is known a priori that data in the backing image will not be needed again.

Because the data being prefetched are not needed urgently, prefetching tries to avoid causing contention on any resource, including the processors (e.g., CPU), storage disks (e.g., DAS, NAS), and the network. The ODS driver monitors the response time Tr to read data from a storage server (e.g., NAS) as well as the response time Tw to write data to a local disk (e.g., DAS). If Tr<Cr and Tw<Cw, the ODS driver continues prefetching, where Cr and Cw are two constant thresholds, e.g., Cr=30 milliseconds (ms) and Cw=30 ms. If either response time is above the threshold, it generates a random number to make a decision about whether to pause prefetching. In one embodiment, with 50% probability it continues prefetching and with 50% probability it pauses prefetching for a fixed period of time. If it decides to pause prefetching, it will wake up later to probe whether the resource contention has disappeared by tentatively copying a small amount of data from a storage server (e.g., NAS) to a local disk (e.g., DAS). It monitors the response times, and decides whether to continue prefetching or go back to sleeping.

Due to the randomness in deciding whether to pause prefetching when the response time is above the threshold, in one embodiment of the present disclosure, when multiple ODS instances contend with each other, 50% of the actively-prefetching ODS instances pause prefetching after each round of prefetching operation, until either all ODS instances stop prefetching or the bottleneck resource is relieved of congestion.

To reduce noises, the response times are calculated as exponential moving averages.

$$T_r^{(n+1)} = 0.9 T_r^{(n)} + 0.1 S_{r\_new\_sample} \quad (1)$$

$$T_w^{(n+1)} = 0.9 T_w^{(n)} + 0.1 S_{w\_new\_sample} \quad (2)$$

Unlike resource management systems that submit multiple concurrent disk I/O requests, prefetching in ODS of the present disclosure in one embodiment may be conservative in resource consumption. For example, it keeps at most one outstanding read request to the backing image on a storage server (e.g., NAS) and at most one outstanding write request to the ODS image on a local disk (e.g., DAS). After it prefetches some data sectors from the storage server (e.g., NAS), it immediately submits the next read request to the storage server (e.g., NAS) and concurrently writes the previously returned data to the local disk (e.g., DAS). When the network latency is low (as it is in data centers) and the system is free of contention, it can drive either the storage server (e.g., NAS) or the local disk (e.g., DAS) to its full utilization.

A policy can be specified to control when prefetching starts. For instance, for the use case of fast VM creation, prefetching can be configured to start 12 hours after the VM is created so that no prefetching is performed for short-lived VMs. For the use of VM migration, prefetching can be configured to start immediately after the VM is migrated so that the migration of virtual disk image can finish earlier.

The ODS of the present disclosure in another embodiment may be used in live VM migration. For instance, in a Cloud environment, the capability of live VM migration greatly enhances the Cloud maintenance and operation. For example, over time it is unavoidable that a host needs hardware maintenance (e.g., replacing an unreliable CPU fan) or software maintenance (e.g., applying a security patch to the hypervisor; for KVM, the hypervisor is Linux). Some maintenance operations require rebooting the host and may cause downtime for VMs running on the host. With the capability of live VM migration, the affected VMs can be migrated to other hosts before the maintenance operation starts so that there is no user-perceived downtime.

To migrate a VM from a source host to a target host, all existing hypervisors (including KVM, Xen, and VMware) require the VM's image file be stored on shared storage that is accessible to both the source host and the target host. Even with DAS, it is still possible to make the VM's image file on the source host accessible to the target host (e.g., through NFS) so that VM migration can succeed. However, in this case, all disk I/O requests generated by the VM on the target host would be directed to and processed by the source host. A reboot of the source host would make the image file unavailable and fail the VM running on the target host.

Figure 5:
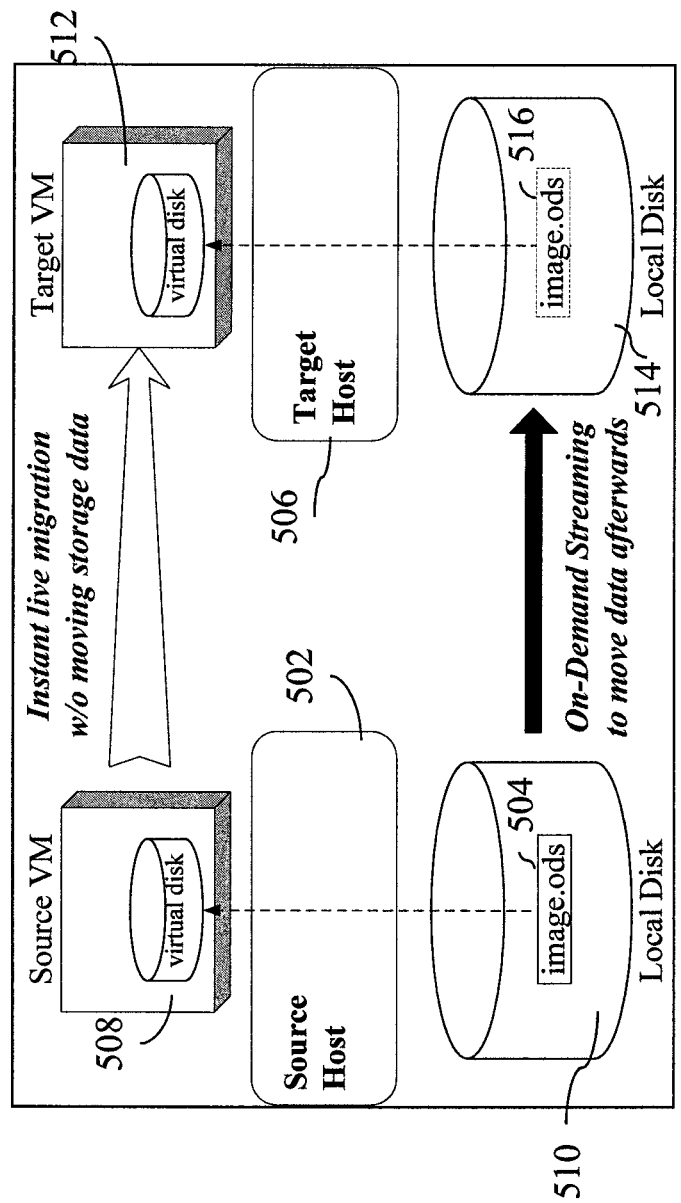
FIG. 5 illustrates system components and operation flow for live migration of a virtual machine with local storage by the ODS of the present disclosure.

The ODS of the present disclosure in one embodiment supports live migration of a VM running on a host's local disk (e.g., DAS). FIG. 5 illustrates system components and operation flow for live migration of a virtual machine with local storage by the ODS of the present disclosure. A source host is a physical computer or machine and runs a VM 508 using the VM's ODS image 504 on its local disk 510. A target host 506 is another physical computer or machine to which the VM 508 is being migrated. The VM 508 on the source host 502 is referred to as source VM; The VM on the target host 506 is referred to as target VM 512 for the sake of explanation. Before the migration starts, the source host 502 exports the VM's image file 504 to the target host 506 through NFS so that the image file is accessible to the target host through network. The target host 506 creates on its local disk 514 (e.g., DAS) an ODS image 516 with a header field of the ODS image's metadata that references or points to the image file exported by the source host as the backing image. The VM 508 then can be migrated instantly without actually copying the VM's image file 504 from the source host 502 to the target host 506. That is, the target VM 512 may be booted on the target host 506 using only the ODS image 516 that initially only includes a reference to a backing image. As the target VM 512 runs uninterruptedly on the target host 506, the ODS of the present disclosure in one embodiment allows the target VM 512 to bring in data through copy-on-read. In addition, the ODS of the present disclosure in one embodiment uses prefetching to copy the rest of the image from the source host 502 to the target host 506. Once prefetching finishes, the VM's image file 504 is completely copied to the target host 506 and the target VM 512 no longer depends on the source host 502 in any way. The source host 502 then can be shut down for maintenance.

With the above-described ODS procedures for virtual machine live migration with local storage, a VM may be migrated instantly without moving data on local storage. A migrated VM (target VM) may continue to run at the new location, and data may be copied on demand as the target VM needs it. The target VM-generated writes are stored locally. Idle time for resources is utilized to prefetch data left behind on the original host (source host). Once all data are prefetched from the source host to the target host, migration fully completes.

FIG. 6 is a flow diagram illustrating an on demand virtual machine image streaming method in one embodiment for creating a new VM. At 602, the method may include copying, from a storage server storing one or more image templates corresponding respectively to one or more virtual machines, an image metadata associated with a selected virtual machine to a host computer's local storage. The host computer's local storage initially does not include an image template of the selected virtual machine. At 604, the method may include booting the selected virtual machine at the host computer using the copied image metadata. At 606, the method may include allowing the selected virtual machine to read data from the image template on the storage server needed to continue executing the selected virtual machine at the host computer, if the needed data are not stored on the host computer's local storage. At 608, the method may include copying the read data of the image template to the host computer's local storage from the storage server, if the read data of the image template are not stored on the host computer's local storage. Subsequent reads to the same data are done from the host computer's local storage. At 610, the method may include setting a bit in a bitmap to indicate that the read data are stored on the host computer's local storage. At 612, data writes to the image template by the selected virtual machine is written to the host computer's local storage. At 614, resource idle time may be utilized to prefetch data of the image template associated with the selected virtual machine from the storage server to the host computer's local storage. In another aspect, response times may be monitored during image prefetching and prefetching may be temporarily paused if a long response time is detected, for example, if a response time exceeds a threshold value.

In one aspect, the image metadata that is copied from the storage server initially includes a reference to the image template. The image metadata may be augmented at the host computer's local storage with a bitmap that maps a bit to a corresponding sector of the image template. In another aspect, the image metadata copied from the storage server may also include this bitmap in addition to the reference to the image template. The corresponding bit in the bit map for the data needed to run the virtual machine is checked to determine whether the data of the image template needed to run the selected virtual machine is stored on the host computer's local storage. Depending on the bit in the bit map, the selected virtual machine reads the image template on the storage server or copied image template on the host computer's local storage. The storage server and the host computer may be computers in a Cloud environment, where for example, a plurality of virtual machines is installed for clients to the Cloud.

FIG. 7 is a flow diagram illustrating a method for on demand virtual machine streaming, for instance, for live migration of VM. At 702, the method may include copying an image metadata associated with a virtual machine, from a source computer storing an image template corresponding to the virtual machine to a target computer. The target computer initially does not include the image template of the virtual machine. At 704, the method may include booting the virtual machine at the target computer using the copied image metadata. At 706, the method may include allowing the virtual machine at the target computer to read data of the image template on the source computer needed to continue executing the virtual machine at the target computer, if the needed data of the image template are not stored on the target computer. At 708, the method may include copying the read data of the image template from the source computer to the target computer, if the read data of the image template are not stored on the target computer. The subsequent reads of the same data are done from the copied data at the target computer. At 710, the method may include setting a bit in a bit map to indicate that the read data are stored on the target computer. At 712, the virtual machine data writes are written to the target computer. At 714, resource idle time may be utilized to prefetch data of the image template associated with the virtual machine from the source computer to the target computer.

In one aspect, the image metadata that is copied from the source computer initially includes a reference to the image template. The image metadata may be augmented at the target computer with a bitmap that maps a bit to a corresponding sector of the image template. In another aspect, the image metadata copied from the source computer may also include this bitmap in addition to the reference to the image template. The corresponding bit in the bit map for the data needed to run the virtual machine is checked to determine whether the data of the image template needed to run the virtual machine is stored on the target computer. Depending on the bit in the bit map, the virtual machine reads the image template on the source computer or copied image template on the target computer. The method shown in FIG. 7 may be performed for live migration of the virtual machine directly from the source computer to the target computer without needing to utilize a separate storage server. The VM can be migrated instantly without migrating its image file. As the VM runs uninterruptedly on the target host, the ODS of the present disclosure in one embodiment may use copy-on-read and prefetching to gradually migrate the image file from the source host to the target host. Once prefetching finishes, the VM no longer needs to depend on the source host, which can be shut down for maintenance.

Figures 8A, 8B, 8C, 8D:
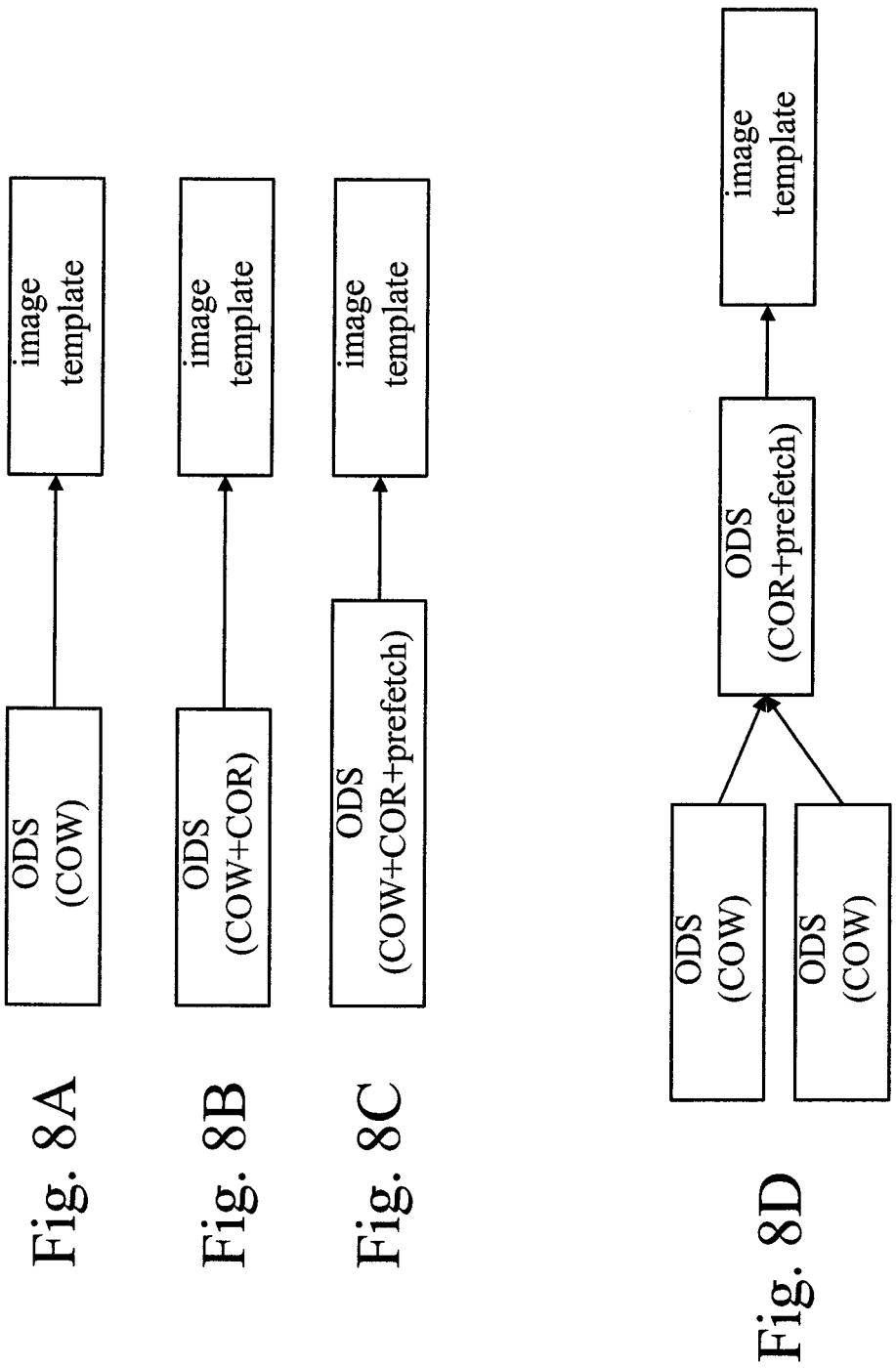
FIGS. 8A-8D show possible different use cases of different features of the ODS of the present disclosure in one embodiment.

In one aspect, the features of ODS (copy-on-write, copy-on-read, and prefetching) can be enabled individually to support different use cases. FIGS. 8A-8D show possible different use cases of different features of the ODS of the present disclosure in one embodiment. In FIG. 8A, only copy-on-write is enabled in ODS. This most basic configuration can be used as a replacement of QEMU's existing COW image format while providing the following benefits: 1) ODS respects QEMU's cache=none option and cache=writethrough option and guarantees data integrity in the event of power failure. 2) ODS' bitmap section and disk data section are properly aligned on page boundary and provides superior performance. In the setup of FIG. 8A, which may be a Cloud as well as a non-Cloud environment, the storage options for the ODS image and the image template are flexible. Both can be stored on host's local disk(s) (e.g., DAS), both can be stored on a storage server (e.g., NAS), or one is stored on host's local disk(s) (e.g., DAS) while the other is stored on a storage server (e.g., NAS).

The setups in FIGS. 8B and 8C may be suitable for a Cloud environment, where the image template is stored on a storage server (e.g., NAS) and the ODS image is stored on a host computer's local disk (e.g., DAS). They support fast VM creation and can gradually migrate the content of the image template into the ODS image to avoid excessive load on network and the storage server NAS.

FIG. 8D shows a setup, where the image template is stored on a storage server (e.g., NAS) and the three ODS images are all stored on a host computer's local storage (e.g., DAS). This setup allows multiple VMs to use separate copy-on-write ODS images but share a single read-only copy of the "ODS (CoR+prefetch)" image, which provides on the local storage (e.g., DAS) a mirror of the image template's content. This setup avoids copying the image template's content from a remote network storage server (e.g., NAS) to a host computer's local storage (e.g., DAS) multiple times, each time for a different VM.

The present disclosure also provides for data integrity. Suppose the following events happen in a sequence: (1) the VM submits a disk write request; (2) the ODS driver (after some processing) acknowledges the successful completion of the write operation; and (3) the host immediately loses power. After power recovers, the VM's next read to the same sector should get the content written before the failure.

Table 1 above shows an example layout of an ODS image on disk in one embodiment of the present disclosure. The ODS of the present disclosure in one embodiment preserves data integrity regardless of when the power failure happens. For example, when performing copy-on-write and copy-on-read, the ODS of the present disclosure in one embodiment may update disk data and bitmap separately. A power failure between the two updates still would not compromise data integrity in the present disclosure in one embodiment as explained below.

A bit in the bitmap can be in one of two states, $S_{in\_backing}=0$ or $S_{in\_ods}=1$, which means the corresponding sector's content is in the backing image or the ODS image, respectively. A sector's state can only change from $S_{in\_backing}$ to $S_{in\_ods}$, and can never change from $S_{in\_ods}$ to $S_{in\_backing}$. There are two scenarios that can change a sector's state from $S_{in\_backing}$ to $S_{in\_ods}$: copy-on-write and copy-on-read.

Copy-on-write happens when ODS handles a disk write request from the VM. For brevity, the discussion below assumes that the write request spans over two disk sectors (d1, d2). Let bit(d1) and bit(d2) denote the states of d1 and d2 in the bitmap, respectively. Further assume that, before the write operation, bit(d1) $S_{in\_backing}$ and bit(d2)=$S_{in\_backing}$. Other cases with more data sectors involved and different initial states can be analyzed in a way similar to the example below.

Handling the write request in ODS may involves the following sequence of operations:
  ODS-W1: the VM issues a write request for two sectors (d1, d2).
  ODS-W2: the ODS driver stores d1 in the ODS image's disk_data section on disk.
  ODS-W3: the ODS driver stores d2 in the ODS image's disk_data section on disk.
  ODS-W4: the ODS driver updates bit(d1) from $S_{in\_backing}$ to $S_{in\_ods}$.
  ODS-W5: the ODS driver updates bit(d2) from $S_{in\_backing}$ to $S_{in\_ods}$,
  ODS-W6: the ODS driver acknowledges to the VM the completion of the write operation.

Note that bit(d1) and bit(d2) may belong to the same sector, and hence ODS-W4 and ODS-W5 may be performed in a single update. Considering a worst-case analysis, separate ODS-W4 and ODS-W5 for a worst-case analysis.

The host may fail after any step above. The present disclosure shows that ODS preserves data integrity regardless of the failures. In particular, ODS introduces no more complication than what may happen to the RAW image format. That is, data integrity in ODS is at least as good as data integrity in the RAW image format.

If the VM uses the RAW image format, handling this disk write involves the following sequence of operations:
  RAW-W1: the VM issues a write request for two sectors (d1, d2).
  RAW-W2: the RAW driver stores d1 on disk.

RAW-W3: the RAW driver stores d2 on disk.

RAW-W4: the ODS driver acknowledges to the VM the completion of the write operation.

Before the VM's write operation, the "old" contents of d1 and d2 are stored in the backing image. After the VM's write operation, their "new" contents are stored in the ODS image. Now consider the failure cases with ODS one by one:

Fail after ODS-W1. In this case, ODS' behavior is equivalent to having a power failure on the RAW image format after RAW-W1. The effect is that the write operation is simply lost, which is an allowed, correct behavior, since the driver did not yet acknowledge to the VM the completion of the write.

Fail after ODS-W2. In this case, d1 is written to the ODS image, but bit(d1) is not updated and remains $S_{in\_backing}$. After power recovers, the VM's next read to d1 gets its content from the backing image, as if the new d1 content in the ODS image does not exist. This behavior is correct and is equivalent to having a power failure on the RAW image format after RAW-W1. The effect is that the write operation is simply lost, which is an allowed, correct behavior, since the driver did not yet acknowledge to the VM the completion of the write.

Fail after ODS-W3. Similar to the one above, after power recovers, the VM's next read to d1 or d2 gets the old content from the backing image, as if the new content in the ODS image does not exist. This behavior is correct and is equivalent to having a power failure on the RAW image format after RAW-W1.

Fail after ODS-W4. After power recovers, the VM's next read to d1 gets its new content from the ODS image, whereas the VM's next read to d2 gets its old content from the backing image (because bit(d1)=$S_{in\_ods}$ and bit(d2)=$S_{1\_backing}$). This behavior is correct and is equivalent to having a power failure on the RAW image format after RAW-W2.

Fail after ODS-W5. After power recovers, the VM's next read to d1 or d2 gets the new content from the ODS image (because bit(d1)=$S_{in\_ods}$ and bit(d2)=$S_{in\_ods}$). This behavior is correct and is equivalent to having a power failure on the RAW image format after RAW-W3, i.e., the write operation is completed but not yet acknowledged.

Fail after ODS-W6. After power recovers, the VM's next read to d1 or d2 gets the new content from the ODS image (because bit(d1)=$S_{in\_ods}$ and bit(d2)=$S_{in\_ods}$). This behavior is correct and is equivalent to having a power failure on the RAW image format after RAW-W4.

The analysis above proves that the ODS of the present disclosure in one embodiment may preserve data integrity during copy-on-write. Following a similar process, it can be proven that the ODS of the present disclosure in one embodiment also may preserve data integrity during copy-on-read, by following the correct update sequence—first updating the ODS image's disk data section and then updating the bitmap section.

An implementation of the ODS of the present disclosure in one embodiment may reduce disk input/output (I/O) overhead. For instance, compared with the RAW image format, a naive implementation of ODS may incur overhead on reading and writing the bitmap. In the worst case, a set of sequential write requests from the VM may generate the following write sequence on the host's file system: write s1, write bit(s1), write s2, write bit(s2), write s3, write bit(s3), . . . , and so forth. Here s1, s2, and s3 are sectors with consecutive logical block address, and bit(si) is the corresponding bit of si in the bitmap. In this example, the disk head may move back and forth between the ODS image's disk data section and bitmap section. A technique is presented in one embodiment of the present disclosure to eliminate in most common cases the overhead associated with updating the bitmap, while not compromising data integrity.

In a Cloud environment, the size of a VM's image template is typically much smaller than the ephemeral storage space allocated for the VM. For example, 10 GB is the maximum image template size allowed for a known VM running on DAS, while the ephemeral storage space provided to that VM is 170 GB or more. The additional ephemeral storage space can be provided to the VM either by expanding the VM's root disk based on the image template, or by attaching additional virtual disks to the VM. Another known Cloud targets enterprise customers and provides more flexible configurations. It allows a VM to use a root disk much larger than 10 GB.

Below is the process of preparing a Linux image template in a Cloud. The image template uses the RAW image format. Suppose the initial image template size is 50 GB. It is first installed with the needed software and fully tested. Then the ext3 file system in the image template is resized to its minimum size (e.g., from 50 GB down to 12 GB) by using the resize2fs tool. The image template is finally truncated to fit the minimum file system size (e.g., from 50 GB to 12 GB). The resizing and truncating step gets rid of garbage data generated during installation and testing, and produces an image template of a minimum size. A small image template helps reduce the amount of data transferred from NAS to DAS when create new VMs based on the image template.

Following the example above, the 12 GB image template can be used to create VMs whose root disk sizes may vary, depending on how much the user pays. For example, the following QEMU command creates a 100 GB ODS image on DAS, based on the 12 GB image template stored on NFS.

qemu-img create -f ods -b /nfs/template.raw vm.ods 100G

After using fdisk to expand the virtual disks partition size from 12 GB to 100 GB, resize2fs can be used to expand the ext3 file system in the ODS image from 12 GB to 100 GB, which will become the VM's large root file system. Note that using resize2fs to expand a file system is a quick operation because it need not relocate blocks.

In the ODS image format shown in Table 1, disk data size is the size of the ODS image perceived by the VM, and effective backing image size is the size of the backing image. For the example above, disk data size=100G and effective backing image size=12G.

FIG. 2 illustrates the concept that the ODS image can be larger than the backing image. For a data sector whose logical block address (LBA) is beyond the size of the backing image, its content cannot reside in the backing image and can only reside in the ODS image. Since the sector's state is known a priori, there is no need to capture the sector's state in the ODS image's bitmap section. As a result, the size of the bitmap is proportional to the size of the backing image, rather than the size of the ODS image.

For a 2TB ODS image pointing to a 10 GB backing image, the size of the bitmap is only 2.5 MB. Because of its small size, the entire bitmap can be easily cached in memory, which avoids the overhead of repeatedly reading the bitmap from disk. In a known Cloud, 10 GB is the maximum image template size allowed for a VM running on DAS. When handling a read request from the VM for a sector S whose logical block address (LBA) is beyond the size of the backing image, the ODS driver knows that, simply based on the LBA, this sector cannot be in the backing image and hence reads it from the ODS image's disk data section. When handling a write request from the VM for the sector S, the ODS driver directly writes the data to the disk data section and there is no need to update the bitmap (actually, there is even no corresponding bits for the sector S in the bitmap).

Because the image template is reduced to its minimum size by resize2fs and the data in the image template are mostly read-only by its template nature (e.g., program executable), most disk write requests from the VM target sectors are those whose addresses are beyond the size of the backing image. For these write requests, the ODS driver writes the data to a local disk (e.g., DAS) directly and there is no overhead in updating the bitmap.

Below one optimization for sparse image templates where many data sectors are filled with zeros is described in one embodiment of the present disclosure. For a RAW image template image.raw, the qemu-img tool may be used to create an ODS image template image.ods whose backing image is image.raw. The size of image.ods is identical to the size of image.raw. When creating image.ods, qemu-img can search for zero-filled sectors S and set their states in the bitmap to $S_{in\_ods}$. The states for non-zero sectors are set to $S_{in\_backing}$. At runtime, when the VM reads the sector S whose state is $S_{in\_ods}$, the ODS driver reads from the ODS image's disk data section and gets a zero-filled sector returned, which is the desired behavior. This happens because the ODS image is stored on the host's file system as a sparse file, and the sector S has never been written before, and hence the host operating system (OS) returns a zero-filled sector.

The ODS image template image.ods is stored on NAS together with image.raw. When creating a new VM on a host, it copies image.ods from a storage server (e.g., NAS) to a local storage (e.g., DAS), and resizes image.ods to the larger target size. Copying image.ods is fast because its disk data section is empty and hence the size of image.ods is small. Specifically, for a 10 GB image.raw, image.ods is only about 2.5 MB. Resizing image.ods into a larger virtual disk only may include updating the disk_data_size field in Table 1 to a larger value. When the VM boots, the ODS driver will automatically truncate the disk data section to size indicated by the disk_data_size field.

When a VM boots, the ODS driver loads the ODS images bitmap section from disk into memory, which contains data sectors initial states. In the present disclosure, these two copies of bitmap are referred to as on-disk state and in-memory state, respectively. At runtime, the ODS driver always keeps the in-memory state up-to-date, but may lazily update the on-disk state in order to reduce disk I/O overhead. However, it is guaranteed that, in the event of power failure, stale information in the on-disk state would never compromise data integrity.

When the VM reads a sector whose in-memory state is $S_{in\_ods}$, the ODS drivers reads the sector from the ODS image and returns it to the VM. No additional overhead is involved. When the VM reads a sector whose in-memory state is $S_{in\_backing}$, the ODS driver reads the sector from the backing image and returns it to the VM. After the VM continues to process the returned data, in the background (i.e., asynchronously), the ODS driver writes the sector's content into the ODS images disk data section and updates the sector's in-memory state from $S_{in\_backing}$ to $S_{in\_ods}$. However, the sector's on-disk state is not updated and remains $S_{in\_backing}$, which reduces disk I/O overhead. The "dirty" bits of the in-memory state can be flushed to update the on-disk state lazily, either periodically (e.g., once every hour) or when the VM shuts down. If the host loses power before the on-disk state is updated, after power recovers, the ODS driver re-loads the stale on-disk state into memory, and the sector's state is observed as $S_{in\_backing}$. When handling the VMs next read to this sector, the ODS driver repeats the copy-on-read process again: reading the sector from the backing image, returning it to the VM, asynchronously writing it to the ODS image, and updating the in-memory state from $S_{in\_backing}$ to $S_{in\_ods}$. Without immediately updating the on-disk state during copy-on-write, the VM still gets the correct sector content after recovery, although it may ignore the sector's content already copied to the ODS image.

When the VM writes to a sector, the ODS drivers checks the on-disk state (as opposed to the in-memory state) to determine the appropriate action. If the sector's on-disk state is $S_{in\_ods}$ (the sector's in-memory state is also $S_{in\_ods}$), the ODS driver writes the sector to the ODS image directly and acknowledge to the VM that the write operation has completed. No bitmap updating overhead is involved. If the sector's on-disk state is $S_{in\_backing}$ (the sector's in-memory state can be either $S_{in\_backing}$ or $S_{in\_ods}$), the ODS driver writes the sector to the ODS image, updates the on-disk state to $S_{in\_ods}$ (also updates the in-memory state to $S_{in\_ods}$ if it currently is $S_{in\_backing}$), and acknowledges to the VM the completion of the write operation. In this case, it may incur the overhead of updating the on-disk state.

In another embodiment, asynchronous implementation may be provided that reduce memory overhead. All block device drivers in QEMU implement the BlockDriver interface, which provides APIs to do both synchronous I/O and asynchronous I/O. The former only allows the block device to handle one outstanding I/O request at a time. The latter allows the block device to handle multiple outstanding I/O requests concurrently, by having the block device driver notify the VM of the completion of I/O operations through callback functions.

The ODS of the present disclosure in one embodiment implements the asynchronous interface. In some corner cases, doing copy-on-write and copy-on-read on the same data sector is handled carefully. Suppose the VM submits a read request $R_d$ for a data sector d whose in-memory state is $S_{in\_backing}$, and then submits a write request $W_d$ for the same sector d before the read finishes. When handling this, suppose the ODS driver finishes the operations in the following sequence:

1. Read the sector's old content from the backing image, as part of the copy-on-read operation for $R_d$.
2. Write the sector's new content to the ODS image, as part of the copy-on-write operation for $W_d$.
3. Write the sector's old content to the ODS image, as part of the copy-on-read operation for $R_d$.

A race condition may occur when doing copy-on-write and copy-on-read for the same data sector. What is left in the ODS image is the sectors old content, which is an incorrect outcome. To properly handle this and other similar race conditions, before performing copy-on-read for a data sector d, the ODS driver checks whether there is one outstanding copy-on-write operation for d. If so, the copy-on-read operation is abandoned. Similarly, before performing copy-on-write for a data sector d, the ODS driver checks whether these is one outstanding copy-on-read operation for d. If so, the copy-on-write operation is delayed until the outstanding copy-on-read operation finishes, which ensures that the new content is left on the disk.

The ODS of the present disclosure in one embodiment may perform the following optimizations:

The size of an ODS image's bitmap section is proportional to the size of the backing image rather than the size of the ODS image. For a 2TB ODS image pointing to a 10 GB backing image, the size of the bitmap is only 2.5 MB.

Note that 10 GB is the maximum image template size allowed for a known Cloud's VM running on DAS.

Because of the small size of the bitmap, a complete copy of the bitmap can be kept in memory to avoid overhead in repeatedly reading the on-disk bitmap.

Once prefetching finishes, an ODS image works almost identical to a RAW image. Disk read or write requests issued by the VM are executed against the ODS image's disk data section directly, without any overhead in checking the in-memory bitmap or updating the on-disk bitmap.

When handling a VM's read or write request for a sector whose logical block address is beyond the size of the backing image, the ODS driver reads or writes the ODS image's disk data section directly, without any overhead in checking the in-memory bitmap or updating the on-disk bitmap When handling a VM's read request for a sector whose in-memory state is already $S_{in\_ods}$, the sector is read from the ODS image directly, without overhead in updating the on-disk bitmap.

A copy-on-read operation only updates the in memory bitmap and does not immediately update the on-disk bitmap.

A copy-on-read operation is not on the critical path of returning the data to the VM. The data are saved to the ODS image asynchronously in the background, while the VM continues to process the data read from the backing image.

When handling a VM's write request for a sector whose on-disk state is already $S_{in\_ods}$, there is no overhead in updating the on-disk bitmap.

If a sector in the backing image is completely filled with zeros, its initial state in the ODS image's on-disk bitmap can be set to $S_{in\_ods}$ so that reading or writing the sector is treated as if the sector is already in the ODS image and there is no overhead in updating the on-disk bitmap, Resizing an ODS image is a constant time operation that only needs to update the disk_data_size field in the layout shown in Table 1.

The ideas of the ODS of the present disclosure in one embodiment include copy-on-write, copy-on-read, and prefetching. Theoretically, it may be possible to implement copy-on-read and prefetching in existing copy-on-write formats already supported by QEMU (e.g., CoW and QCOW2), which avoids the complication of introducing a new image format. The new ODS image format of the present disclosure in one embodiment achieves high performance in the most common cases. The COW format is almost identical to the ODS format. It also includes a header, a bitmap section, and a disk data section. The current implementation of the COW driver ignores QEMU's cache=none option and cache=writethrough option. As a result, it may corrupt disk data in the event of power failure. This implementation issue potentially can be fixed, but the COW format itself has a fundamental limitation—its disk data section is not aligned on 4 KB page boundary. Even if VMs read or write request is aligned on 4 KB page boundary of the virtual disk, after the request is translated to operate on the COW images disk data section, it may no longer be aligned on the host file systems 4 KB page boundary. Because the hosts page cache operates on 4 KB pages, a misaligned request may cause multiple disk I/Os on the host. For example, a well-aligned 4 KB write issued by the VM may be translated into a misaligned 4 KB write in the host, which causes the inefficient read-modify-write behavior, i.e., reading 8 KB, modifying 4 KB, and writing back 8 KB. The ODS format of the present disclosure in one embodiment addresses this problem by adding the padding sections shown in Table 1 to ensure that the bitmap section and the disk data section are properly aligned on 4 KB page boundary.

QCOW2 is the "native format of QEMU. It significantly differs from COW and ODS in that, instead of leveraging the host file systems support for sparse files, it implements its own two-level index to support sparse image files. The index maps a logical block address into a location in the image file where the blocks content is actually stored. This address mapping flexibility allows QCOW2 to provide advanced features such as snapshot and compression.

On the other hand, QCOW2s two-level index also incurs overhead, especially additional disk seeks to read or update the index. Compared with the optimizations in ODS, a potential implementation of QCOW2 enhanced with copy-on-read and prefetching has the following limitations:

The size of the index is proportional to the size of the (large) QCOW2 image rather than the size of the (small) backing image. As a result, the index may not be fully cached in memory.

Even after prefetching finishes, it still needs to read the on-disk index in order to handle a read request issued by the VM, which means extra disk I/O operations.

Even after prefetching finishes, it still needs to read (and potentially write) the on-disk index in order to handle a write request issued by the VM.

When handling a VM's read or write request for a sector whose logical block address is beyond the size of the backing image, it still needs to read or write the index.

Copy-on-read and prefetching operations are likely to update the on-disk index more frequently because it cannot keep the entire index in memory.

The optimizations in the ODS of the present disclosure eliminate the overhead in updating the on-disk bitmap in most common cases. By contrast, the same level of optimization cannot be achieved with QCOW2s two-level index. Since the advanced features of QCOW2 (i.e., snapshot, compression, and encryption) are not used in Cloud, the present disclosure in one embodiment may opt for a simpler image format that provides better performance, i.e., ODS format. QCOW2's snapshot capability has the best potential to be useful to Cloud. A Cloud typically provides two snapshot-like functions: 1) reliable backup, and 2) bundling an image like, i.e., taking a snapshot of the root file system, converting it into an image template, and registering the image template with Cloud for future reuse. However, QCOW2's snapshot is stored in the QCOW2 image on DAS and hence is unreliable as a backup mechanism and cannot be used as an image template to create a new VM on another host.

The present disclosure in one embodiment may support both fast virtual machine (VM) creation and good runtime performance in Cloud. The existing solutions bear at least one two limitations: 1) slow VM creation time due to copying the entire image before creation (e.g., the raw image format driver in KVM); 2) high network traffic and poor performance at runtime due to repeatedly reading data from remote storage server (e.g., the qcow2 image format driver in KVM).

In one embodiment, the on-demand image streaming (ODS) of the present disclosure may provide both fast VM provisioning and good runtime performance. The ODS of the present disclosure may enhance hypervisor with the new "ods" image fotinat and the corresponding driver. Compared with the raw image format used in some existing Clouds, the ODS introduces less network traffic and less input/output (I/O) load on the storage server, not only at the time of provisioning but also aggregated throughout the lifetime of VM. Unlike the raw image format that is used in some existing Clouds, the ODS can boot a VM without making a complete copy of the image template across the network. It may boot a VM instantaneously and then fetch data blocks from the storage server on demand as the data blocks are accessed by the VM.

Unlike the QCOW2 image format, which performs only a copy-on-write but not a copy-on-read and hence may repeatedly read the same data block from a storage server, the ODS of the present disclosure in one embodiment may read a data block from a storage server at most once and then store that block on a local disk for later reuse. Another advantage of the ODS of the present disclosure over QCOW2 may be that QCOW2's data layout in a local disk differs from that of the raw image format; on the other hand, the data block layout of the ODS of the present disclosure may be identical to that of the raw image format. As a result, the DDS's runtime performance may be superior to that of QCOW2.

Experiments show that 1) the ODS of the present disclosure can boot a known operating system server within 14 seconds while transferring less than 17 megabyte (MB) data across the network; and 2) the ODS's runtime performance is as good as the raw image format.

In another embodiment, the ODS of the present disclosure may further include an advanced feature that prefetches the entire VM image from a storage server in the background when or while the resources such as the disk, network, and CPU are otherwise idle. This feature hides network latency and evenly spreads out resource consumption as opposed to waiting and copying the entire VM image at a time of VM creation.

The ODS of the present disclosure may be utilized in Cloud environment. The ODS can also be used in a non-Cloud environment. Further ODS may be utilized with only copy-on-write enabled, for instance, to serve as a high-performance CoW format. Moreover, the implementation of the ODS may be transparent to the guest VM (selected VM running on hypervisor or the like) and hence may be widely applicable.

The ODS of the present disclosure may be implemented as part of a hypervisor or an extension to a hypervisor or like functionality, for instance, providing all functionalities of a hypervisor without any modifications to the guest VM. The capability of ODS, i.e., copy-on-write, copy-on-read, and prefetching, is not provided by any existing hypervisor.

The size of an ODS image's bitmap section is proportional to the size of the backing image rather than the size of the ODS image. Further, a complete copy of the bitmap can be kept in memory due to the small size of the bitmap, which avoids overhead in repeatedly reading the on-disk bitmap. In one aspect, a copy-on-read operation may only update the in-memory bitmap and need not immediately update the on-disk bitmap, which helps reduce disk I/O overhead.

When handling a VM's read and/or write request for a sector whose logical block address is beyond the size of the backing image, the ODS driver reads and/or writes the ODS image's disk data section directly, without any overhead in checking the in-memory bitmap and/or updating the on-disk bitmap. Also, once prefetching finishes, disk read and/or write requests issued by the VM are executed against the ODS image's disk data section directly, without any overhead in checking the in-memory bitmap and/or updating the on-disk bitmap.

In another aspect, a copy-on-read operation may not be on the critical path of returning the data to the VM, and the data may be saved to the ODS image asynchronously in the background while the VM continues to process the data read from the backing image.

Yet in another aspect, if a data sector in the backing image is completely filled with zeros, its initial state in the ODS image's on-disk bitmap is set as if the sector is already in the ODS image, which avoids the overhead in updating the on-disk bitmap and reading the data sector from the storage server.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Peri, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

I claim:

1. A method for on demand virtual machine image streaming, comprising:
    copying, from a storage server storing one or more image templates corresponding respectively to one or more virtual machines, an image metadata associated with a selected virtual machine to a host computer's local storage, wherein the host computer's local storage initially does not include an image of the selected virtual machine, the image metadata initially comprising a header portion having only a reference to the image template corresponding to the selected virtual machine;
    booting the selected virtual machine at the host computer using the copied image metadata, and by accessing the image template from the storage server as needed during the booting;
    allowing the selected virtual machine to read data from the image template on the storage server needed to continue executing the selected virtual machine at the host computer, if the needed data are not stored on the host computer's local storage;
    copying the read data of the image template to the host computer's local storage from the storage server, if the read data of the image template are not stored on the host computer's local storage, wherein subsequent reads to the same data are done from the host computer's local storage;
    setting a bit in a bitmap to indicate that the read data are stored on the host computer's local storage, the bitmap forming a part of the image metadata; and
    utilizing resource idle time to prefetch data of the image template associated with the selected virtual machine from the storage server to the host computer's local storage.

2. The method of claim 1, wherein the image metadata initially includes a reference to the image template and the bitmap that maps a bit to a corresponding sector of the image template.

3. The method of claim 1, wherein response times are monitored during image prefetching and prefetching is temporarily paused if a response time exceeds a threshold value.

4. The method of claim 1, wherein the size of the bitmap is proportional to the size of the image template on the storage server rather than the size of the corresponding image stored on the host computer's local storage.

5. The method of claim 1, wherein a complete copy of the bitmap can be kept in memory.

6. The method of claim 1, wherein the selected virtual machine's read and/or write requests for a sector whose logical block address is beyond the size of the image template on the storage server are handled by reading and/or writing the sector directly in the host computer's local storage without checking the bitmap and/or without updating the bitmap.

7. The method of claim 1, wherein after the prefetching finishes, one or more disk read and/or write requests issued by the selected virtual machine are executed using image data stored on the host computer's local storage directly, without checking the bitmap and/or updating the bitmap.

8. The method of claim 1, the bitmap is kept in memory and on disk at the host computer and wherein a copy-on-read operation only updates the in-memory bitmap and does not immediately update the on-disk bitmap.

9. The method of claim 1, wherein a copy-on-read operation is not on the critical path of returning the data to the VM, and the data are saved to the ODS image asynchronously in the background while the VM continues to process the data read from the backing image.

10. The method of claim 1, wherein if a data sector in the image template on the storage server is completely filled with zeros, initial state of the data sector in the bitmap stored on host computer's local storage is set as if the data sector is already copied to the host computer's local storage.

11. The method of claim 1, wherein the method is implemented in a hypervisor, providing functionalities of the hypervisor without modifications to the selected virtual machine.

12. A method for on demand virtual machine image streaming, comprising:
    copying an image metadata associated with a virtual machine, from a source computer storing an image template corresponding to the virtual machine to a target computer, wherein the target computer initially does not include the image template of the virtual machine, the image metadata initially comprising a header portion having only a reference to the image template corresponding to the selected virtual machine;
    booting the virtual machine at the target computer using the copied image metadata, and by accessing the image template from the storage server as needed during the booting;
    allowing the virtual machine at the target computer to read data of the image template on the source computer needed to continue executing the virtual machine at the target computer, if the needed data of the image template are not stored on the target computer;
    copying the read data of the image template from the source computer to the target computer, if the read data of the image template are not stored on the target computer wherein subsequent reads of the same data read the copied data at the target computer; and setting a bit in a bit map to indicate that the read data are stored on the target computer, the bitmap forming a part of the image metadata.

13. The method of claim 12, wherein the image metadata initially includes a reference to the image template and the bitmap that maps a bit to a corresponding sector of the image template.

14. The method of claim 12, further including determining whether the data needed to run the virtual machine is stored on the target computer by checking the bit in the bit map, wherein depending on the bit in the bit map, the virtual machine reads data from the source computer or from the target computer.

15. The method of claim 12, further including utilizing resource idle time to prefetch data of the image template associated with the virtual machine from the source computer to the target computer.

16. The method of claim 12, wherein the steps are performed for live migration of the virtual machine from the source computer to the target computer wherein a separate storage server is not utilized.

17. A non-transitory computer readable storage medium storing a program of instructions executable by a machine to perform a method for on demand virtual machine image streaming, comprising:

copying, from a storage server storing one or more image templates corresponding respectively to one or more virtual machines, an image metadata associated with a selected virtual machine to a host computer's local storage, wherein the host computer's local storage initially does not include an image template of the selected virtual machine, the image metadata initially comprising a header portion having only a reference to the image template corresponding to the selected virtual machine;

booting the selected virtual machine at the host computer using the copied image metadata, and by accessing the image template from the storage server as needed during the booting;

allowing the selected virtual machine to read data from the image template on the storage server needed to continue executing the selected virtual machine at the host computer, if the needed data are not stored on the host computer's local storage;

copying the read data of the image template to the host computer's local storage from the storage server, if the read data of the image template are not stored on the host computer's local storage, wherein subsequent reads to the same data are done from the host computer's local storage; and setting a bit in a bitmap to indicate that the read data are stored on the host computer's local storage, the bitmap forming a part of the image metadata.

18. The computer readable storage medium of claim 17, wherein the image metadata initially includes a reference to the image template.

19. The computer readable storage medium claim 18, wherein the image metadata further includes the bitmap that maps a bit to a corresponding sector of the image template.

20. The computer readable storage medium of claim 17, further including determining whether the data of the image template needed to run the selected virtual machine is stored on the host computer's local storage by checking the bit in the bit map, wherein depending on the bit in the bit map, the selected virtual machine reads the image template on the storage server or copied image template on the host computer's local storage.

21. The computer readable storage medium of claim 17, further including utilizing resource idle time to prefetch data of the image template associated with the selected virtual machine from the storage server to the host computer's local storage.

22. A system on demand virtual machine image streaming, comprising:

a target computer operable to copy an image metadata associated with a virtual machine, from a source computer storing an image template corresponding to the virtual machine, wherein the target computer initially does not include the image template of the virtual machine, the image metadata initially comprising header portion having only a reference to the image template corresponding to the virtual machine; and a storage device locally attached to the target computer, the target computer further operable to boot the virtual machine at the target computer using the copied image metadata, and by accessing the image template from the storage server as needed during the booting, and allow the virtual machine at the target computer to read data of the image template on the source computer needed to continue executing the virtual machine at the target computer, if the needed data of the image template are not stored on the target computer, the target computer further operable to copy the read data of the image template from the source computer to the storage device locally attached to the target computer, if the read data of the image template are not stored on the target computer, wherein subsequent reads of the same data are done from the storage device locally attached to the target computer, the target computer further operable to set a bit in a bitmap to indicate that the read data are stored on the target computer, the bitmap forming a part of the image metadata.

23. The system of claim 22, wherein the image metadata initially includes a reference to the image template.

24. The system of claim 23, wherein the image metadata further includes the bitmap that maps a bit to a corresponding sector of the image template.

25. The system of claim 22, further including utilizing resource idle time to prefetch data of the image template associated with the virtual machine from the source computer to the target computer.

* * * * *